Sept. 23, 1969 — C. E. SMITH — 3,468,250
DOCUMENT MARKING DEVICE
Filed Jan. 3, 1967 — 2 Sheets-Sheet 2

INVENTOR.
CHARLES E. SMITH
BY Anthony D. Cenname
Donald L. Daley
ATTORNEYS

United States Patent Office 3,468,250
Patented Sept. 23, 1969

3,468,250
DOCUMENT MARKING DEVICE
Charles E. Smith, Webster, N.Y., assignor to Xerox Corporation, Rochester, N.Y., a corporation of New York
Filed Jan. 3, 1967, Ser. No. 606,877
Int. Cl. B41f 13/24, 31/00
U.S. Cl. 101—232                                    6 Claims

ABSTRACT OF THE DISCLOSURE

Apparatus adapted for use in copying machines and the like for placing identifying information on a document after being scanned at a scanning station. A document after being advanced past the scanning station by an endless conveyor member is deflected into the bite formed between engaged pairs of axially spaced roller members which are driven in timed relation with the conveyor member. As the document is advanced between the engaged pairs of roller members it is supported in the transverse direction by suspension between the engaged spaced pairs of roller members. A marking member is connected between one of the spaced pairs of roller members to rotate therewith and contact a document while suspended by the engaged roller pairs.

Field of the invention

This invention relates generally to a document marking device and more particularly to an apparatus for placing one or more identifying marks on a document which has been reproduced.

As a result of the technological advances which have been made with respect to copying or reproducing machines, the use and application thereof has continually expanded. In some applications it has become necessary to keep a record for accounting purposes of those documents which have been reproduced. In many applications it is often desirable to know whether copies have been made from an original document or subject copy, to which it is often referred, merely by visual inspection of the subject copy.

For example, in business operations involving processing of merchandise orders, fascimile transmission equipment is being utilized to a great extent. In such operations, however, some of the orders which are processed may not have been transmitted by facsimile equipment. Due to the fact that it may be necessary to assess an additional cost against those orders which have been transmitted, it is desirable to have this information conveniently available for use in preparing statements. Since statements are generally prepared from information contained on the original orders either at the time of processing or subsequent thereto it is advantageous to have this information on the original order rather than on additional sheets which may become detached or lost or confused with documents which have not been transmitted. It is also advantageous that this information be placed on the original order in a manner which is readily ascertainable upon visual inspection, yet which does not deface or mutilate information on the order to the extent of becoming indiscernible. One method which fulfills these requirements is by placing one or more identifying marks on the order during the process of transmitting.

Summary

Accordingly, it is an object of the present invention to provide apparatus for use in conjunction with a copying machine for placing one or more identifying marks on original documents which have been copied.

Another object of the present invention is to provide an effective means for placing one or more identifying marks on a copied document without destroying or defacing the information on the document.

Another object of the present invention is to provide apparatus for use in conjunction with a copying machine wherein one or more identifying marks may be placed on the documents which have been copied without mutilation of the document.

A further object of the present invention is to provide a document marker having removable printing means.

These and other objects of the present invention are attained by a pair of shafts spaced from the endless conveyor member in copying machines and the like, which are journaled for rotation on axes extending generally transverse to the document feed path, each shaft of which has connected thereto axially spaced pairs of respectively aligned roller members engaged in continuous rolling contact. A marking member connected to one of the shafts between the respective pair of roller members extends radially beyond the periphery thereof to project radially into the space between the other pair of roller members. The marking member and each of the pairs of roller members are operatively driven in timed relation to the conveyor member to advance a document between the bite of the engaged pairs of roller members. The marking member as it is rotated contacts a document supported by suspension between the engaged axially spaced pairs of roller members to place a mark thereon. Other objects of the invention will become readily apparent to those skilled in the art in view of the following detailed disclosure and description thereof especially when read in conjunction with the accompanying drawings.

Brief description of the drawings

FIG. 4 illustrates another embodiment of the document marking device in which the printing means is removably mounted.

Description of the preferred embodiments

Figure 1:
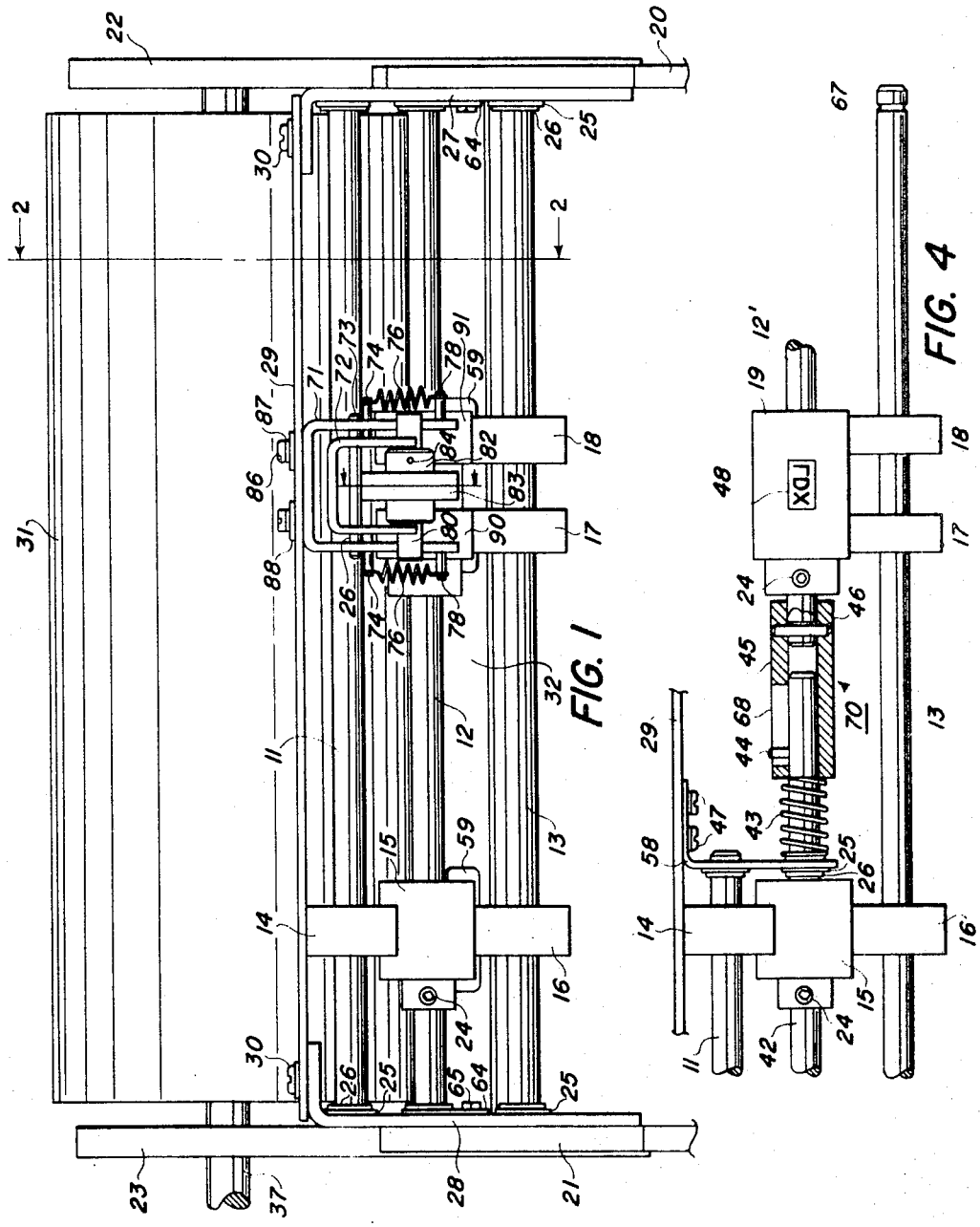
FIG. 1 is a side view of one embodiment of the document marking device adapted for use in conjunction with a facsimile transmission device.
Figure 2:
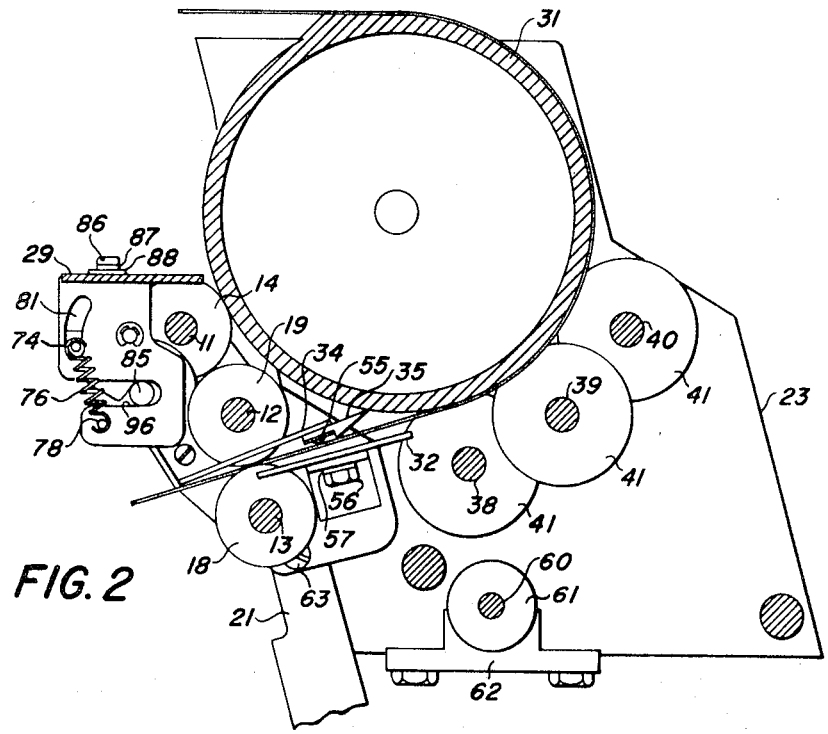
FIG. 2 is a sectional view of FIG. 1.

The document marking device, as shown in FIGS. 1 and 2, is particularly adapted for use in facsimile transmission equipment. To permit ready access to the scanning apparatus, the document conveyor unit of the transmitter is rotatably mounted about drive shaft 60 via bearings 61 and bearing blocks 62 in side frames 22 and 23. Shaft 37 which is rotatably mounted between side frames 22 and 23 and drivingly connected to drive shaft 60 drives conveyor drum 31. A plurality of paper guide rollers 41 located about the periphery of drum 31 are rotatably mounted on paper guide shafts 38, 39, and 40. Additional guide rollers (not shown) are further located about the periphery of drum 31 such that a document being scanned is held in contact with the conveyor drum 31.

A pair of stop bars 20 and 21, only parts of which are shown, are connected to side frames 22 and 23 respectively and serve to limit the angle of rotation through which the conveyor unit may be moved when access to the scanning apparatus is desired.

The document marking device includes a pair of generally L-shaped bearing brackets 27 and 28, having a short portion and a longer portion, which are connected to stop bars 20 and 21 respectively by bolts 63 or other suitable means. A frame tie bar 29 is connected to the short portions of bearing brackets 27 and 28 by bolts 30 or other suitable fastening means. A main drive shaft 11 parallel to shaft 37 is rotatably mounted in bearing brackets 27 and 28 via bearings 25. Retaining rings 26 fit into grooves 67 in shaft 11 adjacent bearings 25 to limit axial movement of shaft 11. A main drive roll 14 fixed to shaft 11 rides in frictional engagement with conveyor drum 31. Through the particular mounting arrangement of the document marking device, main drive roll 14 remains in frictional engagement with the conveyor drum 31 when access to the scanning apparatus is obtained by limited rotation of the conveyor unit.

A marker drive shaft 12 is rotatably mounted similar to drive shaft 11 and parallel thereto in bearing brackets 27 and 28 via bearings 25 and retaining rings 26. A marker drive roll 15 is mounted on shaft 12 and frictionally engages main drive roll 14. Drive roll 15 is held in engagement with shaft 12 by means of a set screw 24.

Platen drive shaft 13 is rotatably mounted similar to shafts 11 and 12 and parallel thereto in bearing brackets 27 and 28 via bearings 25 and retaining rings 26. Platen drive roll 16 is fixed to shaft 13 and frictionally engages marker drive roll 15.

Two roller platens 17 and 18 are connected to shaft 13 and axially disposed from each other in a spaced relationship. Marker roll 19 is mounted on drive shaft 12 and rotatable therewith via set screw 24. Marker roll 19 rotates in frictional engagement with roller platens 17 and 18 and carries stamp means 89 for placing suitable markings on documents which have been copied. Stamp means 89 is axially centered with respect to marker roll 19 and has an imprinting surface extending slightly beyond the periphery of marker roll 19 in the radial direction. The spacing of roller platens 17 and 18 is such that the imprinting surface of stamp 89 does not contact the platens but upon rotation is free to pass between the two platens.

Figure 3:
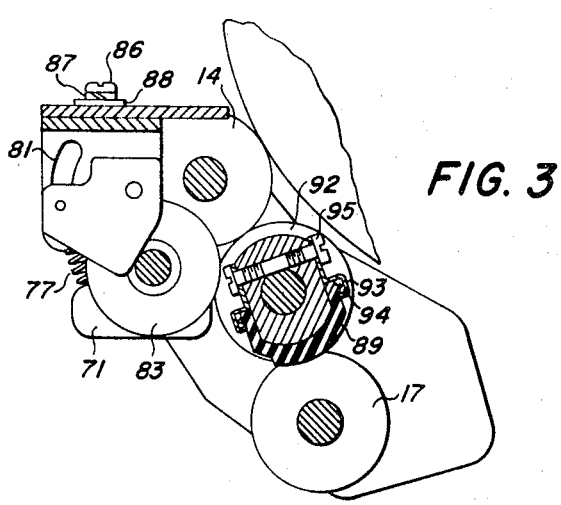
FIG. 3 is a partly sectional view of the embodiment of FIG. 1 illustrating the platen means and marking means.

As illustrated in FIGS. 1–3 the marking means may comprise a marker roll having stamp means thereon and an ink supply roll adapted to be contacted by the stamp means. As illustrated therein, marker roll 19 includes platen engaging surfaces 90 and 91 and a recessed area 92. Stamp 89 is held in recessed area 92 by clips 93 which engage lugs 94 on stamp 89. Clips 93 are connected to marker roll 19 by means of bolts 95 which provide for easy removal of stamp 89 from marker roll 19. When mounted therein clips 93 and bolts 95 lie below the periphery of platen engaging surfaces 90 and 91 on roll 19 and the imprinting surface of stamp 89 projects slightly beyond.

A generally U-shaped bracket 71 for mounting ink supply roll 83 includes a pair of projecting spring connecting pins 78 near the ends thereof, a pair of slots 96 intermediate the ends and the bight portion, and a pair of arcuately shaped slots 81 located nearer the bight portion. Bracket 71 may be connected to tie bar 29 by bolts 86, washers 88, and lock washers 87 or other suitable means. Bushing 82 having ink supply roll 83 connected thereto, is connected to shaft 80 via set screw 84. Shaft 80 is slidably and rotatably mounted in slots 96 of bracket 71. A second generally U-shaped bracket 72 having projecting spring connecting pins 74 thereon is rotatably mounted in bracket 71 via shaft 73 with pins 74 projecting through the arcuately shaped slots 81 of bracket 71. Shaft 73 may be held against axial displacement by retaining rings 26 or other suitable means. Bracket 72 includes a pair of side faces 85 engageable with shaft 80. A pair of springs 76 are connected between pins 74 and 78 thereby normally biasing bracket 72 and shaft 80 in a counterclockwise direction as viewed in FIG. 3. When biased against shaft 80 the inside faces of bracket 72 serve to limit axial displacement of shaft 80 by engagement with the end faces of bushing 82. By rotating bracket 72 in the clockwise direction against the bias of springs 76 shaft 80 with ink roll 83 thereon may be removed from bracket 71.

In the normally biased position ink roll 83 is in alignment with and extends slightly into the recessed area 92 between platen engaging surfaces 90 and 91 of marker roll 19. Upon rotation of marker roll 19, the imprinting surface of stamp 89 engages ink roll 83 which is slighlty displaced along slot 96 against the bias of springs 76. As stamp 89 rotates in contact with ink roll 83 ink is transferred from roll 83 to the imprinting surface of stamp 89. Ink supply roll 83 comprises a microporous plastic material having a relatively non-volatile supply of ink suspended within which is incorporated into the plastic at the time of manufacture. Ink on the surface of the ink roll 83 is picked up by the imprinting surface of stamp 89 which surface ink then is replaced by capillary action from the supply within.

The document marking device further includes a paper guide plate 32 transversely mounted between bearing brackets 27 and 28 via brackets 57. Brackets 57 may be fixed to bearing brackets 27 and 28 by spot welding or other suitable means. Paper guide plate 32 may be fixed to brackets 57 by means such as bolts 56. Paper guide plate 32 extends between paper guide rollers 41, and platen drive roll 16 and roller platens 17 and 18. Suitable cutouts 59 in paper guide plate 32 may be provided to supply operating clearances between the guide plate and the respective rolls.

A second paper guide plate 34 is provided which includes bracket portions 64. Paper guide plate 34 is mounted above guide plate 32 at a slight inclination and connected to bearing brackets 27 and 28 via bolts 65 or other suitable means through bracket portion 64. Guide plate 34 extends past rolls 15 and 19 in the outfeed direction to direct a document generally downwardly. A paper pickoff plate 35 is mounted on the leading edge of paper guide plate 34 by rivets 55 or other suitable means and extends into close proximity with drum 31. Pickoff plate 35 serves to deflect documents from the periphery of drum 31 onto the surface of paper guide plate 32. Suitable cutouts 59 are provided in guide plate 34 for operating clearance of rolls 15 and 19.

Thus it may be seen that as drum 31 rotates in a clockwise direction as viewed in FIG. 2, shaft 11 and roll 14 rotate counterclockwise, shaft 12 and rolls 15 and 19 rotate clockwise, and shaft 13 and rolls 16, 17 and 19 rotate counterclockwise. The diameter of the respective rolls is so chosen to provide the same rate of advancement of the document 36 through the marking device as is provided over drum 31.

As the document 36 to be scanned in the transmitter is fed into the unit, the leading edge of the document contacts the rotating surfaces of drum 31 and guide rolls 41, partly shown in FIG. 2. As the drum rotates, the document is held in close contact with the drum by guide rolls 41 and advanced past the scanning station, not shown. When the document 36 reaches pickoff plate 35 it is deflected from drum 31 onto guide plate 32. Guide plates 32 and 34 then serve to guide document 36 to contact drive rolls 15 and 16, roller platen 17 and 18, and marker roll 19. As the document is advanced from drum 31 it passes between rolls 16, 17 and 18; and 15 and 19. As roll 19 rotates the imprinting surface of stamp 89 is brought into contact with ink supply roll 83 thereby inking the imprinting surface of stamp 89. Upon continued rotation of roll 19 the imprinting surface of stamp 89 is brought into contact with the backside of document 36 once per revolution of roll 19. This leaves a series of markings on the back of the document as the document is advanced through the marking device. After the document passes from the marking unit it may be deposited on a tray or shelf awaiting further processing.

A second embodiment of the document marking device is illustrated in FIG. 4. As in the embodiment of FIG. 1, platen drive shaft 13 is rotatably mounted in bearing brackets 27 and 28 via bearings 25 and retaining rings 26. Platen drive roll 16 is fixed to shaft 13 as are roller platens 17 and 18.

An intermediate L-shaped bearing bracket 58 having a short portion and a longer portion is connected through the short portion to frame tie bar 29 by bolts 47 or other suitable fastening means. The longer portion of bearing bracket 58 depends from tie bar 25 in substantial alignment with bearing brackets 27 and 28 and substantially parallel therewith. A main drive shaft 11' is rotatably mounted parallel to shaft 37 in bearing brackets 28 and 58, via bearings 25 and retaining rings 26. Main drive roll 14 fixed to shaft 11' rides in frictional engagement with conveyor drum 31.

Idler shaft 42 is rotatably mounted parallel to shaft 11' in bearing brackets 28 and 58 via bearings 25 and retaining rings 26. Idler roll 15 is connected to shaft 42 via set screw 24 and rides in frictional engagement with rolls 14 and 16. Shaft 42 extends through bearing bracket 58 and carries a cylindrical coupling 70 at the end thereof.

Cylindrical coupling 70 may be comprised of an annular member 45 mounted on shaft 42 and axially displaceable therewith. An elongated slot 68 near one end of annular member 45 extends axially along shaft 42. A pin 44 fixedly mounted in shaft 42 extends radially into slot 68 thereby restricting angular movement of annulus 45 with respect to shaft 42 and at the same time permitting limited axial displacement. A coil spring 43 surrounding shaft 42 extends between bearing bracket 58 and annulus 45 thereby normally biasing annular member 45 against pin 44. A pin 46 is fixedly mounted near the other end of annular member 45 and extends radially within. A shaft 12' carrying marker roll 19 is rotatably mounted at one end in bearing bracket 27 via bearing 25 and retaining ring 26 or other suitable removable bearing arrangements. The other end of shaft 12' is mounted in annular member 45. The end of shaft 12' which fits into annular member 45 may be flat or slotted depending on the manner in which marker roll 19 is to be driven. If marker roll 19 is to be driven separately from roller platens 17 and 18, the end may be slotted, pin 46 thereby fitting into the slot providing a positive drive of marker roll 19 via shaft 42, coupling 70 and shaft 12'. If marker roll 19 is to be driven via roller platens 17 and 18, the end of shaft 42 may be flat thereby riding in abutting engagement with pin 46.

With either arrangement, to remove shaft 12' and hence roll 19 and stamp 48, annular member 45 is axially displaced toward bearing bracket 58 against the bias of spring 43, until the end of coupling 45 clears the end of shaft 12'. Shaft 12' may then be removed from its mounting in bearing bracket 27.

Stamp 48 is comprised of a micro-porous plastic material having a relatively non-volatile supply of ink suspended within which is incorporated into the plastic at the time of manufacture. Ink on the imprinting surface of the stamp is picked up by the surface of a subject copy which surface ink then is replaced by capillary action from the supply within.

Although stamp 48 is illustrated as one segment of roll 19, the stamp could be comprised of a complete cylinder or annulus. The surface of stamp 48 may be void as to any specific designation or it may include suitable indicia or characters for more specific designation such as that illustrated in FIG. 4.

Figure 5:
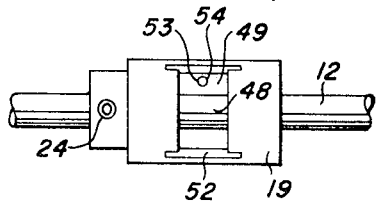
FIG. 5 illustrates one means for removably mounting the printing means in the marker roll.
Figure 6:
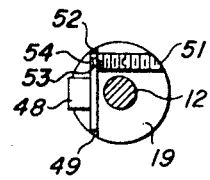
FIG. 6 is a sectional view of the embodiment of FIG. 5.

Stamp 48 may be mounted in marker roll 19 as illustrated in FIGS. 5 and 6 or by other suitable means. As shown therein marker roll 19 includes a key way 52 and a threaded lock screw hole 51. Stamp 48 may be mounted on base plate 49 by any suitable adhesive material. Base plate 49 is adapted to fit into key way 52 in marker roll 19 and includes an aperture 54 for holding the stamp in place.

A lock screw 50 located in threaded hole 51 includes a pin projection 54 adapted for insertion into aperture 53 when locking screw 50 is in place.

Paper guide plates 32 and 34 are transversely mounted between bearing brackets 27 and 28 as illustrated in the embodiment of FIG. 1.

Thus it may be seen that there are provided two embodiments of document markers effective for placing one or more identifying marks on original documents which have been copied in which the marking means is removably mounted.

What is claimed is:

1. In copying machines and the like in which a document is advanced past a scanning station by an endless conveyor member, document marking apparatus for placing identifying information on documents which have been copied comprising,
    a pair of shafts spaced from said conveyor member and journaled for rotation on axes extending generally transverse to the document feed path,
    a first pair of axially spaced roller members connected to one of said shafts,
    a second pair of axially spaced roller members connected to the other of said shafts, said second pair of roller members being respectively axially aligned to engage said first pair of roller members in continuous rolling contact,
    a marking member connected to one of said shafts between the respective pair of said roller members, said marking member extending radially beyond the periphery of said pair of roller members to project radially into the space between the other pair of said roller members,
    guide means for deflecting a document from said conveyor member into the bite formed between the respectively engaged pairs of said first and said second pairs of roller members, and
    drive means operatively connecting said conveyor member and said pair of shafts for rotating each of said pairs of roller members and said marking member to advance a document between the respectively engaged roller pairs as said marking member is advanced to contact said document supported by said pairs of roller members.

2. The apparatus according to claim 1, said marking member comprising a micro-porous ink impregnated plastic material.

3. The apparatus according to claim 1, further including,
    an ink supply roll adapted for engagement with said marking member, said supply roll comprising a micro-porous ink impregnated plastic material.

4. In facsimile apparatus and the like in which a document is advanced past a scanning station by an endless conveyor member, document marking apparatus for placing identifying information on documents which have been scanned at the scanning station comprising,
    a pair of shafts spaced from said conveyor member and journaled for rotation on axes extending generally transverse to the document feed path,
    a first pair of axially spaced roller members connected to one of said shafts,
    a second pair of axially spaced roller members connected to the other of said shafts, said second pair of roller members being respectively axially aligned to engage said first pair of roller members in continuous rolling contact,
    guide means for deflecting a document from said conveyor member into the bite formed between the respectively engaged pairs of said first and said second spaced pairs of roller members,
    drive means operatively connecting said conveyor member and said pair of shafts for rotating each of said spaced pairs of roller members to advance a document between the respectively engaged roller pairs, said document being suspended in the transverse direction between said axially spaced roller pairs, and
a marking member connected to one of said shafts between the respective pair of said axially spaced roller members to rotate therewith, said marking member dimensionally extending radially into the space between the other pair of said spaced roller members to contact a document as the document is suspended between the axially spaced respectively engaged roller pairs.

5. The apparatus according to claim 4, said marking member comprising a micro-porous ink impregnated plastic material.

6. The apparatus according to claim 4, further including,
an ink supply roll adapted for engagement with said marking member, said supply roll comprising a micro-porous ink impregnated plastic material.

References Cited

UNITED STATES PATENTS

| | | | |
|---|---|---|---|
| 1,418,562 | 6/1922 | Haase | 101—349 XR |
| 1,540,081 | 6/1925 | Manischewitz | 101—349 XR |
| 1,914,502 | 6/1933 | Heaton | 101—216 |
| 2,763,208 | 9/1956 | Rockoff et al. | 101—327 XR |
| 2,773,446 | 12/1956 | Koeber | 101—233 |
| 2,818,016 | 12/1957 | Alessi et al. | 101—216 XR |
| 3,203,345 | 8/1965 | Gibbons | 101—349 XR |

ROBERT E. PULFREY, Primary Examiner

J. REED FISHER, Assistant Examiner

U.S. Cl. X.R.

101—349, 378